United States Patent [19]
Williams

[11] Patent Number: 5,913,384
[45] Date of Patent: Jun. 22, 1999

[54] TREADMILL LUBRICATING DEVICES AND METHODS

[75] Inventor: Charles Williams, 24331 Bluegrass Ct., Moreno Valley, Calif. 92553

[73] Assignee: Charles Williams, Moreno Valley, Calif.

[21] Appl. No.: 08/655,711

[22] Filed: Jun. 3, 1996

[51] Int. Cl.⁶ .............................. F16N 7/00; A63B 22/02
[52] U.S. Cl. ............................................ 184/15.1; 482/54
[58] Field of Search ............................... 184/15.1, 16, 17, 184/64, 101–102; 474/91, 237, 273; 482/54; 198/500, 841; 118/264; 206/209, 209.1, 229, 361, 362; 81/125.1, 436; 428/304.4, 537.1; 15/104.93, 244.1, 244.2, 244.3, 244.4

[56] References Cited

U.S. PATENT DOCUMENTS

| | | | |
|---|---|---|---|
| 1,746,452 | 2/1930 | Wesson | 81/125.1 |
| 2,313,787 | 3/1943 | Vaughn | 15/244.1 |
| 3,659,845 | 5/1972 | Quinton | 482/54 |
| 4,668,537 | 5/1987 | Matsuyama et al. | 118/264 |
| 5,163,885 | 11/1992 | Wanzer et al. | 482/54 |
| 5,302,162 | 4/1994 | Pasero | 482/54 |
| 5,542,892 | 8/1996 | Buhler | 482/54 |

FOREIGN PATENT DOCUMENTS 0017744 of 1896 United Kingdom .................. 15/244.1

OTHER PUBLICATIONS

The Puch Jogger, Published by Steyr–Daimler–Puch (GB) Ltd., before Jul. 18, 1977.

*Primary Examiner*—Christopher Verdier
*Attorney, Agent, or Firm*—Crockett & Fish; Robert D. Fish

[57] ABSTRACT

An elongated lubrication applicator is used to manually lubricate the belt and/or belt supporting surface of an exercise treadmill. The lubrication applicator is optionally included in a kit containing lubricant and at least one treadmill belt tension adjusting device.

19 Claims, 2 Drawing Sheets

TREADMILL LUBRICATING DEVICES AND METHODS

FIELD OF THE INVENTION

The field of the invention is treadmill maintenance.

BACKGROUND OF THE INVENTION

It is widely accepted that walking or running can improve one's health and fitness. Where it is inconvenient or undesirable to walk or walk out-of-doors, treadmills can be used to enable a person to walk or run in place.

In general, treadmills have a stationary structure, a translating surface and one or more mechanisms for creating the translational movement. In a typical embodiment, an endless belt rotates about two parallel rollers located on opposite ends of the stationary structure. The stationary structure is designed such that the rotating endless belt is taut around the outer surface of the parallel rollers, and coupled to follow their rotational direction. A support deck, located slightly below the rotating endless belt, provides a rigid surface to support the weight of a user.

While the above-described treadmill design is satisfactory to provide a walking or running surface, it suffers from considerable friction among the components. For example, as the user steps onto the rotating belt, the belt is pressed against the support deck, thereby causing frictional contact between the stationary and non-stationary parts. This frictional contact is generated each time the user takes a step and may severely diminish the performance and longevity of the various treadmill components.

It is therefore advantageous to minimize the frictional contact between the rotating belt and the support deck of a treadmill. This is typically achieved by applying a lubricating medium between the two surfaces, prior to assembly and at servicing intervals. Unfortunately, servicing of treadmills is costly because the existing practice requires that a skilled technician loosen or remove the endless belt to apply a uniform and adequate layer of lubricant. Moreover, servicing renders the treadmill unusable for periods of time ranging from ½ hour to 1 hour. While this down-time may seem nominal, it becomes significant to businesses such as health clubs that may own numerous treadmills.

At the other extreme, it is known to provide treadmills with built-in lubricating devices. U.S. Pat. No. 5,433,679, issued Jul. 18, 1995, entitled "Exercise treadmill and method", incorporates electronically controlled devices for automatically applying a lubricating medium to either the inner surface of the rotating belt, or directly onto the support deck. In one embodiment, the lubricant is drawn from a reservoir and sprayed onto the desired surface. In other embodiments, lubricating bars are affixed near the application surface. Lubrication control systems then track servicing intervals and automatically activate the lubrication process. While these automatic lubricating treadmills represent an excellent way of minimizing the friction generated by the user, they are of limited commercial impact. The additional lubrication mechanisms and their control circuitry can significantly increase the cost of the treadmill, and their benefit can generally only be enjoyed by purchasers of new treadmills. Individual consumers, who have already spent a minimum of $300 for their treadmill, are unlikely to spend more for the latest improvement in treadmill technology. Health clubs, who spend on the order of $2,000 to $3,000 for each treadmill, are bound by capital budget and depreciation considerations that make such purchases cost prohibitive.

Consequently, there is a need for a device and method for lubricating the friction bearing surfaces of a treadmill, that will enable quick and adequate lubrication, and also reduce the overall time required for servicing. Additionally, there is a need for a treadmill "do-it-yourself" maintenance kit which may obviate or reduce the need for a skilled service technician. Other and further objects and advantages will appear hereinafter.

SUMMARY OF THE INVENTION

The present invention provides apparatus and methods for lubricating the friction bearing surfaces of an assembled treadmill, using an elongated applicator. In many cases the elongated or "strip" applicator allows lubrication to proceed without loosening or removing the rotating endless belt, thereby minimizing the time required for lubrication.

A preferred embodiment of the invention provides a "do-it-yourself" maintenance kit which includes a strip applicator, lubricant and various tools commonly used in treadmill maintenance.

BRIEF DESCRIPTION OF THE DRAWINGS

In the drawing, wherein similar reference characters denote similar elements throughout the several views.

DETAILED DESCRIPTION OF THE DRAWING

Figure 1:
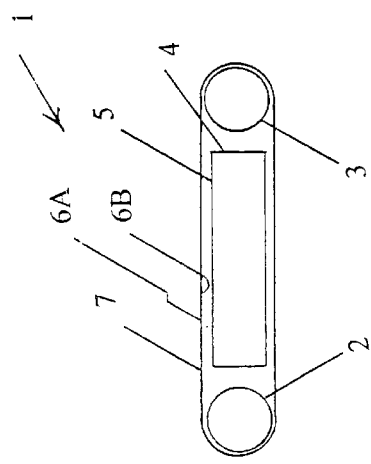
FIG. 1 is a side view of a prior art treadmill support deck, and the endless belt-to-roller system.

In FIG. 1 a treadmill 1 generally comprises a forward located roller 2, a rearward located roller 3, an endless belt 7 operating about rollers 2 and 3, and a longitudinal support deck 4. A typical treadmill would also include a support stand (not shown) and a hand hold (not shown), and in some models may include electronics (not shown) and a motor (not shown) to drive the belt.

The operation of treadmill 1 is known in the art. A user (not shown) steps onto the outer exercise surface 6A of belt 7 and begins to walk or run. The weight of the user exerts a downward force on belt 7, pressing the inner friction surface 6B of belt 7 against the upper support surface 5 of support deck 4.

Figure 2:
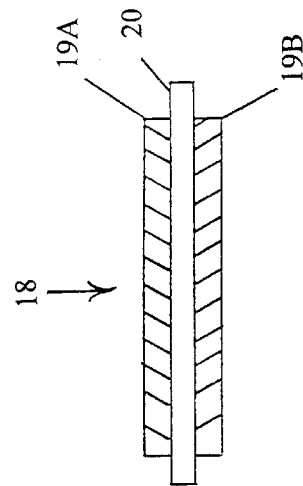
FIG. 2 is an isometric view of a strip applicator according to the present invention.

In FIG. 2, a strip applicator 8 generally comprises an elongated lubrication pad 9 affixed to an elongated backing 10. The lubrication pad 9 preferably measures about 16" long by ¾" wide by ¼" thick, although other shapes are contemplated in which the length is at least several times the width, and preferably at least three, five or seven times the length. Thus, for large belt treadmills, the lubrication pad may be 25" or more in length, and one inch or more in width. For smaller belt treadmills, the lubrication pad can be smaller, measuring 14", 10", 8", 6" or less in length. Lubrication pad 9 advantageously comprises a material which is suitable for receiving an appropriate lubricant, wicking the lubricant into the interior of the pad, and then releasing the lubricant smoothly and easily during application. The presently preferred material for pad 9 is open cell foam, available from Macklanburg-Duncan, Oklahoma City, Okla.

There are numerous other materials that could advantageously be used in the lubrication pad, including various foams and felts known in the art, and especially including F-10 white felt by Boston Felt, East Rochester, N.H.

Many other embodiments are possible with respect to the pad. For example, the pad may be affixed to the backing in removable or non-removable ways. A pad may, for example, have its own internal support, which may be removably slipped into a channel defined by the backing.

The backing 10 preferably measures about one inch longer than the lubrication pad 9, and about 0.25" to 0.5" wider. As backing 10 is elongated, its length is preferably longer than its width but the ratio of the width of backing 10 to the length of backing 10 is not limited to any particular range of values. Dimensions which fit within the contemplated concept of elongated include a width which is no more than 1/7 of the length, and a width which is less than 1/3 the length. Backing 10 is preferably relatively thin, but strong enough to support the lubrication pad 9 as it is pushed or pulled between the endless belt 7 and the support deck 4 (see FIG. 3). The preferred backing is a lattice wood composite available from Capitol Lumber, Mont., measuring approximately 17.5" long by 1" wide by 1/8" thick.

Figure 3:
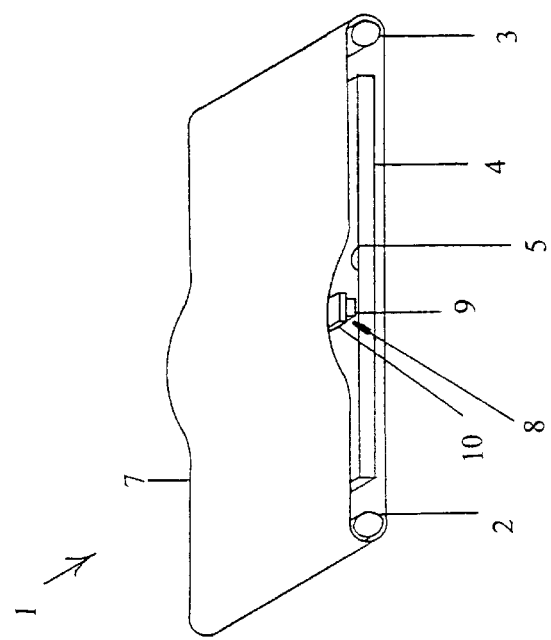
FIG. 3 is an isometric view of a treadmill with the endless belt displaced, and the strip applicator of FIG. 2 invention inserted for applying lubricant.

In FIG. 3, strip applicator 8 upon which a lubricant (see FIG. 5) has been deposited is shown inserted between the inner friction surface 6 of belt 7 and the upper support surface 5 of the support deck 4. Strip applicator 8 is preferably inserted parallel to the long axes of the rollers 2,3 and perpendicular to the long axis of the treadmill 1, although insertion may take place at other angles as well.

Lubrication pad 9 can be faced downwards to lubricate the supporting surface 5 of the support deck 4, or faced upwards to lubricate the inner surface 6 of the belt 7, and both embodiments are contemplated herein. Where the lubrication pad 9 is faced downwards the strip applicator 8 is pulled or pushed across the face of the supporting surface 5 a sufficient number of times to deposit a relatively even coating of lubricant across supporting surface 5. Where the lubrication pad 9 is faced upwards, the strip applicator 8 is preferably pulled or pushed across the inner surface 6 of belt 7. Belt 7 can also be manually rotated while the position of strip applicator 8 is held relatively constant, but such application is not recommended.

Depending on the amount of lubricant to be deposited, the strip applicator 8 may need to be withdrawn and reinserted one or more times to receive additional applications of lubricant.

It is also contemplated that the strip applicator 8 can be used to apply lubricant to a treadmill at a position other than that shown in FIG. 3, but again, such application is not recommended. For example, a strip applicator could be used to apply lubricant directly to rollers 2 or 3, or directly to belt 7 at an opening where support deck 4 is separated from rollers 2 or 3.

Figure 4:
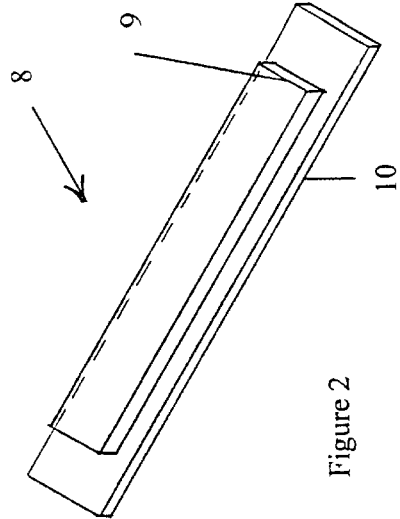
FIG. 4 is a side view of a two-sided strip applicator according to another aspect of the present invention.

FIG. 4 depicts an alternative strip applicator 18 having lubrication pads 19A and 19B on opposite sides of the base 20. In this embodiment lubricant is applied to both pads 19A and 19B prior to insertion of strip applicator 18 between the belt 7 and the support deck 4. This allows simultaneous lubrication of both the inner friction surface 6B of belt 7 and support surface 5 of support deck 4.

Figure 5:
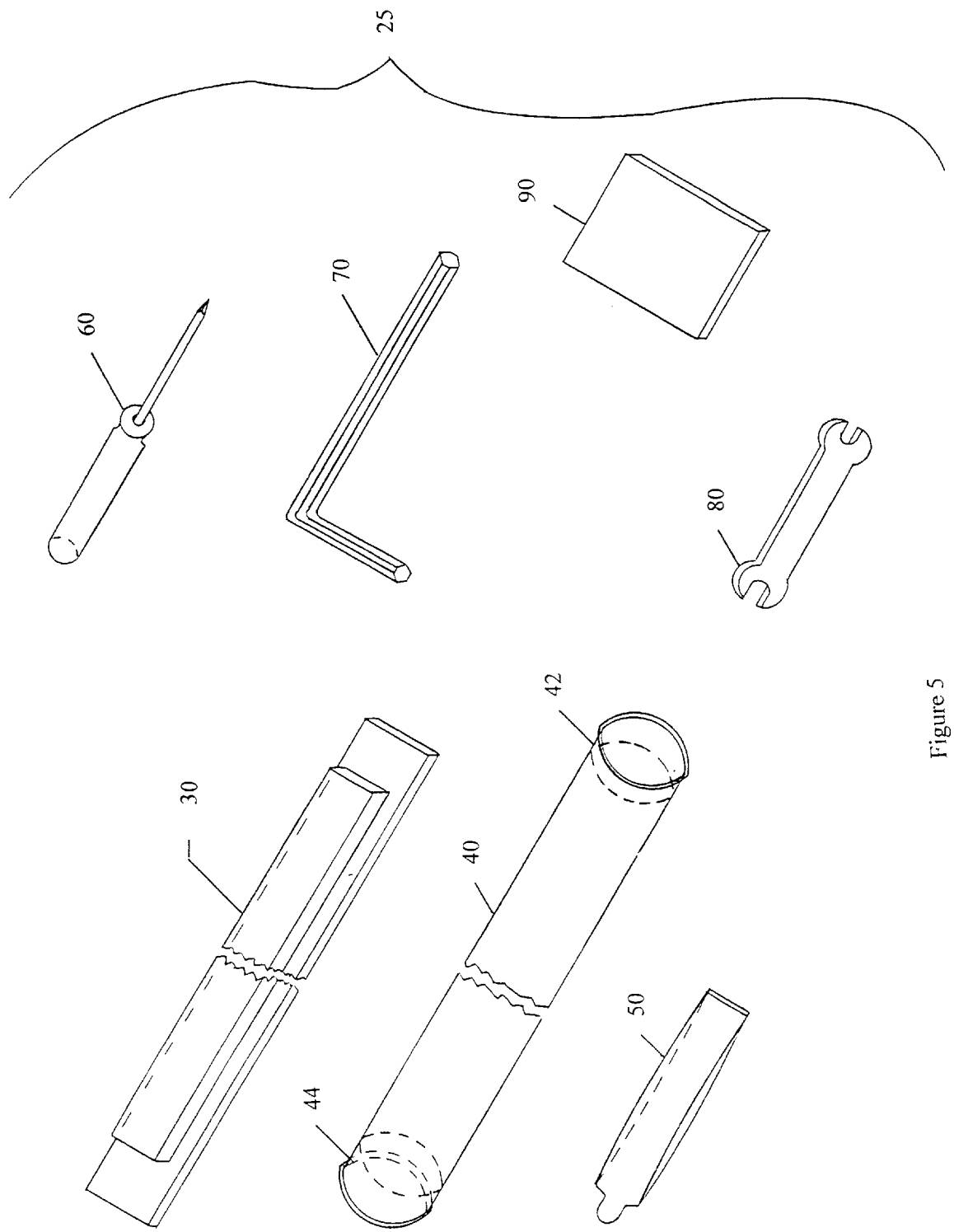
FIG. 5 is a schematic of a maintenance kit according to another aspect of the present invention.

In FIG. 5 a maintenance kit 25 comprises a strip applicator 30, a storage container 40, one or more lubricant packs 50, a Phillip's head screw driver 60, an Allen wrench 70, an open end wrench 80, and an instruction guide 90. The kit 25 is intended to include many tools commonly used in the maintenance of treadmills, but, of course, does not include every tool which could be required in performing such maintenance.

Strip applicator 30 has been described previously, and storage container 40 is merely a container sized and dimensioned to contain the strip applicator 30 when not in use. Storage container 40 is preferably constructed of a stiff cardboard tube, although plastic or other storage containers are also possible. Similarly, while storage container 40 preferably has end caps 42 and 44 for keeping out dust and debris, although other types of closures may be utilized.

Lubricant pack 50 contains a lubricant suitable for lubricating the interface between the belt 7 and the support 4. One chief consideration is that the viscosity should be neither too high nor too low. A too high viscosity might make the treadmill operate too slowly or might collect in a thick residue, and a too low viscosity might wear off too quickly and might drip onto the floor. Other considerations are that the lubricant should be relatively long lasting, and should appear "clean" to the user. The presently preferred lubricant is Dow Corning 200(F) water based silicon lubricant available from Dow Corning. Lubricant packs 50 are advantageously single-use, non-closable containers to encourage the user to apply an appropriate amount of lubricant. Presently, preferred lubricant packs 50 contain about 0.5 ounces of lubricant, and the kit 50 preferably contains three lubricant packs 50.

The Phillip's head screw driver 60 is preferably size #2, suitable for motor cover removal.

The two wrenches, the Allen wrench 70 and the open end wrench 80 are examples of treadmill belt tension adjusting device. Allen wrench 70 preferably has a 3/16" hex key at both ends, and the open end wrench is preferably a 1/2" opening. These sizes are useful for adjusting the belt tension of many domestic treadmills.

Thus, devices and methods for lubricating the friction bearing surfaces of a treadmill have been described. While embodiments and applications of this invention have been shown and described, it will be apparent to those skilled in the art that many more modifications are possible without departing from the inventive concepts herein. For example, in alternative embodiments the elongated pad on a single backing might be replaced by multiple pads affixed to the same side of the backing. A first pad might be more absorbent than of the lubricant than a second pad, while the second pad might be better suited to smoothing out the lubricant deposited onto the treadmill. In another alternative embodiment one or more of the pads might be impregnated with a cleaner for removing oil or dirt from the surface being treated, while another pad is used for depositing the fresh lubricant. The invention, therefore, is not to be restricted in the spirit of the claims.

What is claimed is:

1. A method for lubricating a surface of an exercise treadmill, said method comprising:
    providing a lubricant;
    providing an applicator strip having an application area, said strip at least 10" in length, and having a width less than one third the length;
    applying the lubricant to the application area;
    manually operating the application strip to spread the lubricant from the application area to the surface.

2. The method of claim 1 further comprising providing the applicator strip at least 10" in length.

3. The method of claim 1 further comprising providing the applicator strip at least 14" in length.

4. The method of claim 1 further comprising providing the applicator strip at least 16" in length.

5. The method of claim 1 further comprising providing the applicator strip at least 10" in length, and having a width less than one seventh the length.

6. The method of claim 1 further comprising providing the applicator strip at least 14" in length, and having a width less than one seventh the length.

7. The method of claim 1 further comprising providing the applicator strip at least 16" in length, and having a width less than one seventh the length.

8. A manual applicator for applying a lubricant to an apparatus comprising:

an elongated backing at least 6" in length and having a width less than one third the length; and an elongated pad affixed to the backing, the pad at least partially permeable to the lubricants;

wherein the applicator is not attached to the apparatus being lubricated.

9. The applicator of claim 8 wherein the backing is at least 10" in length.

10. The applicator of claim 8 wherein the backing is at least 14" in length.

11. The applicator of claim 8 wherein the backing is at least 17" in length.

12. The applicator of claim 8 wherein the backing is at least 10" in length and the width is no more than one seventh the length.

13. The applicator of claim 8 wherein the backing is at least 14" in length and the width is no more than one seventh the length.

14. The applicator of claim 8 wherein the backing is at least 17" in length and the width is no more than one seventh the length.

15. A treadmill maintenance kit for use with a treadmill, comprising:

a lubricant;

a manual applicator which is not attached to the treadmill, comprising an elongated backing at least 6" in length and having a width less than one third the length, and an elongated pad affixed to the backing, the pad at least partially permeable to the lubricant; and a treadmill belt tension adjusting device.

16. The kit of claim 15 wherein the treadmill belt tension adjusting device comprises an Allen wrench.

17. The kit of claim 15 wherein the treadmill belt tension adjusting device comprises an open end wrench.

18. The kit of claim 15 wherein the treadmill belt tension adjusting device comprises at least one of an Allen wrench and an open end wrench, and the kit further comprising a container sized and dimensioned to house the applicator.

19. The kit of claim 18 further comprising an instruction guide.

\* \* \* \* \*